United States Patent
Okamoto et al.

(10) Patent No.: US 9,806,470 B2
(45) Date of Patent: Oct. 31, 2017

(54) CONNECTOR AND WIRING HARNESS FOR CONNECTING ADJACENT ELECTRODE TERMINALS OF A PLURALITY OF BATTERIES

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Ryoya Okamoto, Yokkaichi (JP); Hiroomi Hiramitsu, Yokkaichi (JP); Hiroki Hirai, Yokkaichi (JP)

(73) Assignees: AUTONETWORKS TECHNOLOGIES, LTD. (JP); SUMITOMO WIRING SYSTEMS, LTD. (JP); SUMITOMO ELECTRIC INDUSTRIES, LTD. (JP)

(*) Notice: Subject to any disclaimer, the term of this patent is extended or adjusted under 35 U.S.C. 154(b) by 0 days.

(21) Appl. No.: 14/361,540

(22) PCT Filed: Nov. 12, 2012

(86) PCT No.: PCT/JP2012/079206
§ 371 (c)(1),
(2) Date: May 29, 2014

(87) PCT Pub. No.: WO2013/080780
PCT Pub. Date: Jun. 6, 2013

(65) Prior Publication Data
US 2014/0322978 A1  Oct. 30, 2014

(30) Foreign Application Priority Data

Nov. 30, 2011 (JP) .................... 2011-261378

(51) Int. Cl.
*H01R 13/68* (2011.01)
*H01R 13/688* (2011.01)
(Continued)

(52) U.S. Cl.
CPC ............ *H01R 13/68* (2013.01); *H01M 2/206* (2013.01); *H01M 2/305* (2013.01);
(Continued)

(58) Field of Classification Search
CPC ..... H01R 13/68; H01R 13/684; H01R 13/688
(Continued)

(56) References Cited

U.S. PATENT DOCUMENTS 6,168,470 B1 * 1/2001 Ikeda et al. .............. 439/620.08
6,240,637 B1   6/2001 Ikeda et al.
(Continued)

FOREIGN PATENT DOCUMENTS

| EP | 1 646 063 | 2/2007 |
| JP | 2001-110396 | 4/2001 |
| JP | 2006-107965 | 4/2006 |

OTHER PUBLICATIONS

International Search Report of Jan. 22, 2013.
European Patent Appl. No. 12 852 801.5-Search Report issued on Nov. 19, 2014.

*Primary Examiner* — Chandrika Prasad
(74) *Attorney, Agent, or Firm* — Gerald E. Hespos; Michael J. Porco; Matthew T. Hespos (57) ABSTRACT

A connector (20) includes a connecting member (15) with a main body portion (16) for connecting adjacent electrode terminals (12A, 12B) of a plurality of battery cells (11) including positive and negative electrode terminals (12A, 12B) and a first terminal (22) extending from the main body portion (16), a battery-side connector housing (29) accommodating the first terminal (22), a wire-side connector
(Continued)

housing (36) to be connected to the battery-side connector housing (29) and an end part of a wire (37, and a fuse (25) arranged in the battery-side connector housing (29) to electrically connect the first terminal (22) and the wire (37).

8 Claims, 8 Drawing Sheets

(51) Int. Cl.
| | |
|---|---|
| *H01R 31/08* | (2006.01) |
| *H01M 2/20* | (2006.01) |
| *H01M 2/30* | (2006.01) |
| *H01R 11/28* | (2006.01) |
| *H01M 10/48* | (2006.01) |

(52) U.S. Cl.
CPC ........... *H01R 13/688* (2013.01); *H01R 31/08* (2013.01); *H01M 10/482* (2013.01); *H01M 2200/103* (2013.01); *H01R 11/288* (2013.01)

(58) Field of Classification Search
USPC .......................................... 439/620.26–620.34
See application file for complete search history.

(56) References Cited

U.S. PATENT DOCUMENTS

| | | | | |
|---|---|---|---|---|
| 6,935,020 | B2* | 8/2005 | Ikeda | 29/854 |
| 7,176,780 | B2* | 2/2007 | Iwata | 337/188 |
| 7,978,046 | B2* | 7/2011 | Ohashi et al. | 337/186 |
| 8,808,031 | B2* | 8/2014 | Zhao | 439/620.27 |
| 2003/0108789 | A1 | 6/2003 | Yamakawa et al. | |
| 2011/0244283 | A1 | 10/2011 | Seto et al. | |
| 2013/0288530 | A1* | 10/2013 | Zhao | 439/627 |
| 2015/0022931 | A1* | 1/2015 | Okamoto et al. | 361/104 |

\* cited by examiner

CONNECTOR AND WIRING HARNESS FOR CONNECTING ADJACENT ELECTRODE TERMINALS OF A PLURALITY OF BATTERIES

BACKGROUND OF THE INVENTION

1. Field of the Invention

The present invention relates to a connector and a wiring harness.

2. Description of the Related Art

A battery module for electric and hybrid vehicles is known from Japanese Unexamined Patent Publication No. 2001-110396. In this battery module, a plurality of battery cells each including positive and negative electrode terminals are juxtaposed and the electrode terminals of adjacent battery cells are connected by connecting members, whereby the plurality of battery cells are connected in series or parallel.

Detection terminals are connected to the electrode terminals. Wires are connected to these connected detection terminals to form a wiring harness. The wires are arranged in groove portions formed in the battery module and connected to a battery ECU arranged outside the battery module. Voltages of the battery cells are detected in this battery ECU.

Since the above wires are for detecting the voltages of the battery cells, a relative low current flows therein. However, since the wires are connected to the electrode terminals of the battery cells, the battery cells are shorted if a plurality of wires are shorted. Accordingly, in a technique according to Japanese Unexamined Patent Publication No. 2001-110396, fuses are soldered to the detection terminals. This causes the fuses to be fused to suppress a short circuit of the battery cells if the wires are shorted.

The detection terminals according to the above configuration are fixed by being bolted to the electrode terminals. Thus, if the number of the detection terminals increases, there is a problem of reducing the efficiency of an operation of assembling the detection terminals, the fuses and the wires with the electrode terminals.

The present invention was completed based on the above situation and aims to provide a connector and a wiring harness which enable a connecting operation of electrode terminals, a fuse and a wire to be efficiently performed.

SUMMARY OF THE INVENTION

The present invention is directed to a connector, including a connecting member with a main body portion for connecting adjacent electrode terminals of a plurality of battery cells including positive and negative electrode terminals and a first terminal extending from the main body portion; a battery-side connector housing accommodating the first terminal; a wire-side connector housing to be connected to the battery-side connector housing and an end part of a wire; and a fuse arranged in the battery-side connector housing to electrically connect the first terminal and the wire.

Further, the present invention is directed to a wiring harness, including a connecting member with a main body portion for connecting adjacent electrode terminals of a plurality of battery cells including positive and negative electrode terminals and a first terminal extending from the main body portion, a battery-side connector housing accommodating the first terminal, a wire-side connector housing to be connected to the battery-side connector housing, a wire drawn out from the wire-side connector housing and a fuse arranged in the battery-side connector housing to electrically connect the first terminal and the wire.

According to the present invention, the electrode terminals, the connecting member, the first terminal, the fuse and the wire can be easily connected by connecting the battery-side connector housing and the wire-side connector housing. This can improve the efficiency of a connecting operation of the connecting member, the fuse and the wire.

The following modes are preferable as embodiments of the present invention.

Preferably, a fuse mounting portion into which the fuse is to be removably mounted is formed in the battery-side connector housing, the fuse is connected to the first terminal, and a relay member made of metal for electrically connecting the fuse and the wire is further arranged in the battery-side connector housing.

According to the above mode, the fuse can be easily exchanged by removing the fused fuse from the fuse mounting portion and mounting a new fuse into the fuse mounting portion.

Preferably, a fitting tube portion, into which the wire-side connector housing is to be fitted, and the fuse mounting portion are open in the battery-side connector housing, and the fitting tube portion and the fuse mounting portion are open in the same direction.

According to the above mode, the wire-side connector housing and the fuse can be mounted into and detached from the battery-side connector housing in the same directions. This can improve the efficiency of an assembling operation of the wire-side connector housing and the fuse as compared with the case where the opening direction of the fitting tube portion and that of the fuse mounting portion are different.

Preferably, the connecting member is formed with a locking portion, and the battery-side connector housing is formed with a lock receiving portion to be engaged with the locking portion.

According to the above mode, the battery-side housing can be mounted on the connecting member by a simple method of engaging the locking portion and the lock receiving portion.

According to the present invention, a connecting operation of electrode terminals, a fuse and a wire can be efficiently performed.

DETAILED DESCRIPTION OF THE PREFERRED EMBODIMENTS

One embodiment in which a connector 20 and a wiring harness 21 according to the present invention are applied to a battery module 10 is described with reference to FIGS. 1 to 10. This battery module 10 is configured by mounting wiring harnesses 21 on a battery cell group 13 formed by juxtaposing a plurality of battery cells 11. This battery module 10 is used, for example, as a drive source for an electric vehicle, a hybrid vehicle or the like. In the following description, a vertical direction is based on FIG. 1 and lower and upper sides of FIG. 2 are respectively referred to as front and rear sides concerning a front-back direction. Further, left and right sides of FIG. 2 are respectively referred to as left and right sides.

Figure 1:
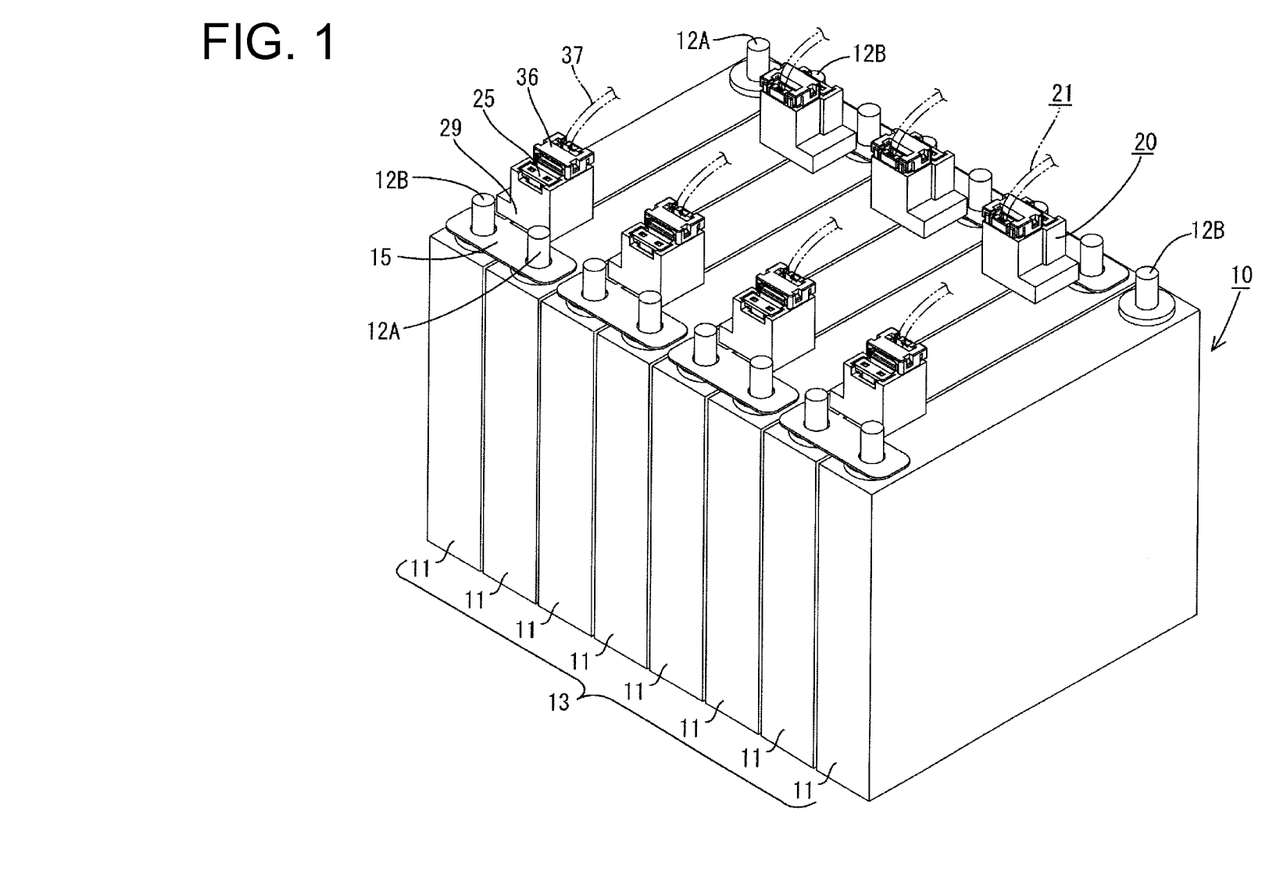
FIG. 1 is a perspective view showing a battery module according to one embodiment of the present invention.
Figure 2:
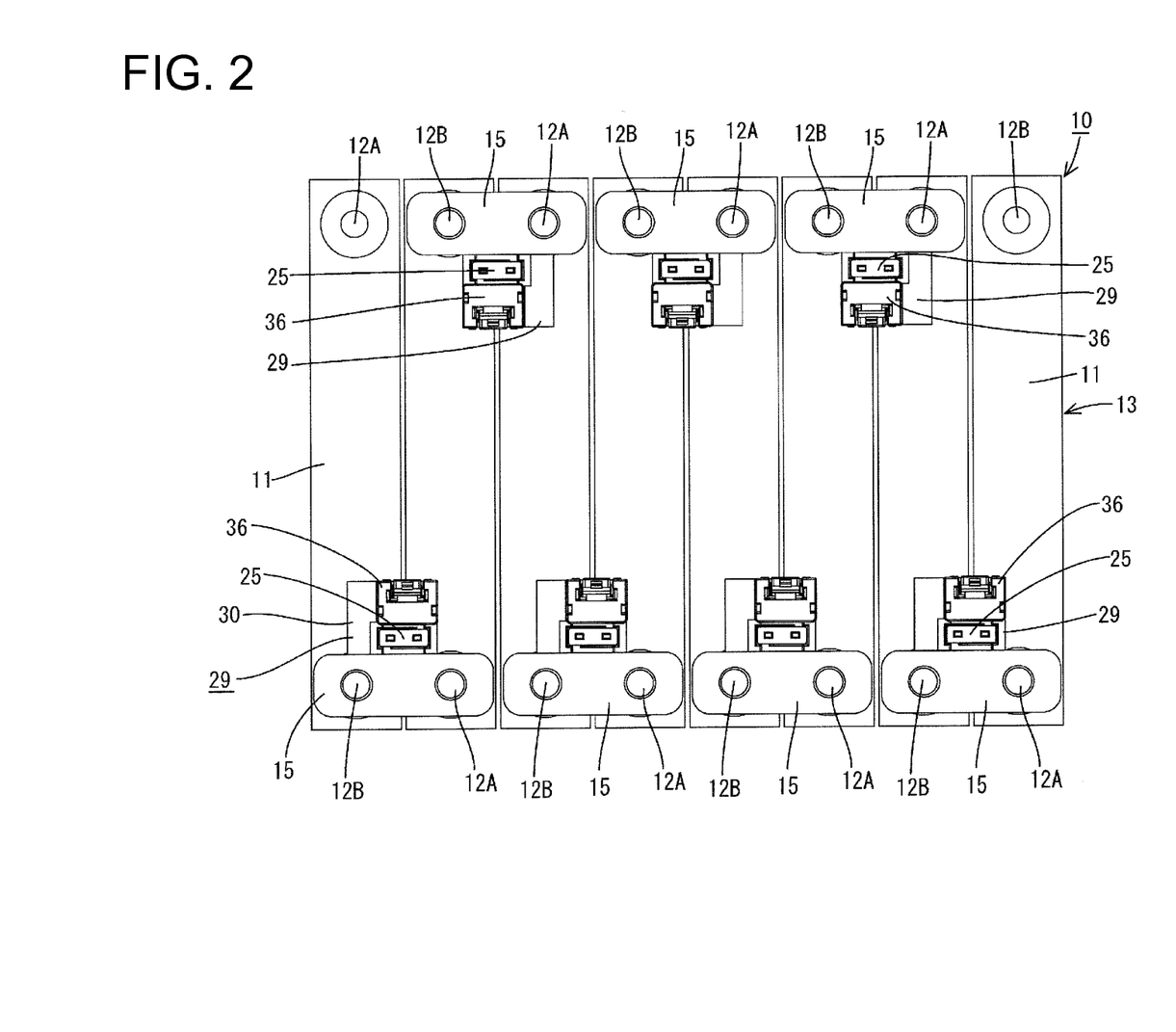
FIG. 2 is a plan view showing the battery module.

As shown in FIG. 1, the battery module 10 includes the battery cell group 13 composed of a plurality of battery cells 11 juxtaposed in a lateral direction, and the wiring harnesses 21 arranged on the upper surface of the battery cell group 13.

An unillustrated power generation element is housed in each battery cell 11. A pair of vertically projecting electrode terminals 12A, 12B are provided on the upper surface of the battery cell 11. The electrode terminals 12A, 12B (positive electrode terminal is denoted by 12A and negative electrode terminal is denoted by 12B) are bolts provided on front and rear parts of the battery cell 11 and include a threaded groove on the outer periphery.

The battery cells 11 are so arranged that the orientations of the polarities (positive and negative) thereof are opposite between adjacent battery cells 11. This causes the electrode terminals 12A, 12B having different polarities to be adjacent to each other. These plurality of battery cells 11 are fixed by an unillustrated holding plate. In the battery cell group 13 thus configured, the electrode terminals 12A, 12B are arranged in two front and rear rows and a plurality of battery cells 11 are connected in series by mounting connecting members 15.

Figure 3:
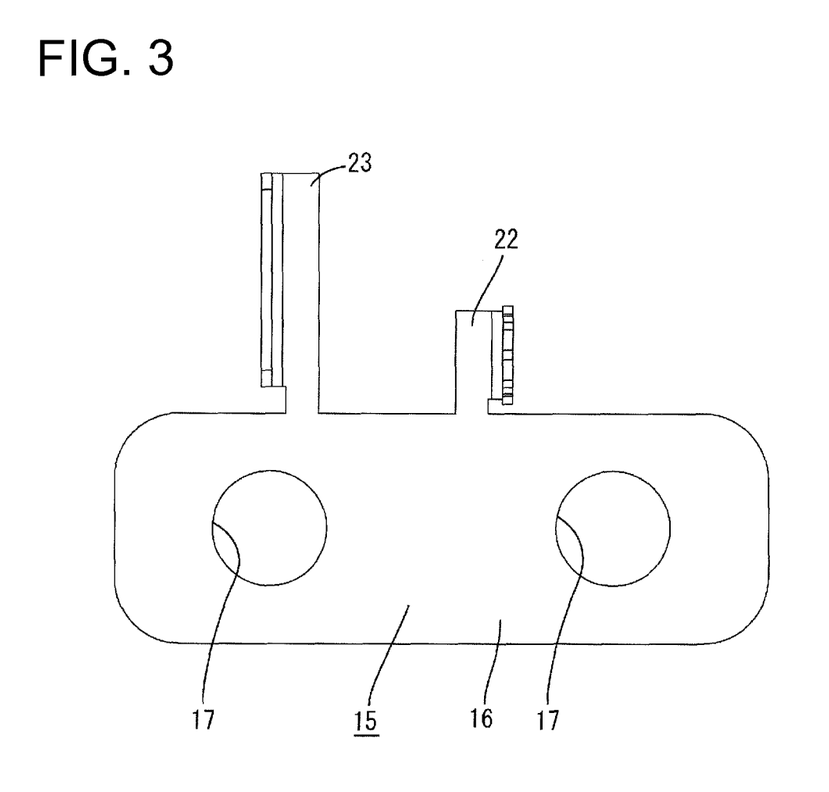
FIG. 3 is a plan view showing a connecting member.

The connecting member 15 is formed by press-working a metal plate material into a predetermined shape. The connecting member 15 is made of the metal plate material such as copper, copper alloy or aluminum and includes, as shown in FIG. 3, a main body portion 16 long and narrow in the lateral direction and configured to connect adjacent electrode terminals 12A, 12B. A pair of left and right insertion holes 17, 17 are formed to penetrate through the main body portion 16. The insertion holes 17, 17 have a circular shape.

The connecting member 15 is formed with a first terminal 22 and a locking portion 23 extending in the front-back direction from the main body portion 16 and spaced apart in the lateral direction.

Figure 4:
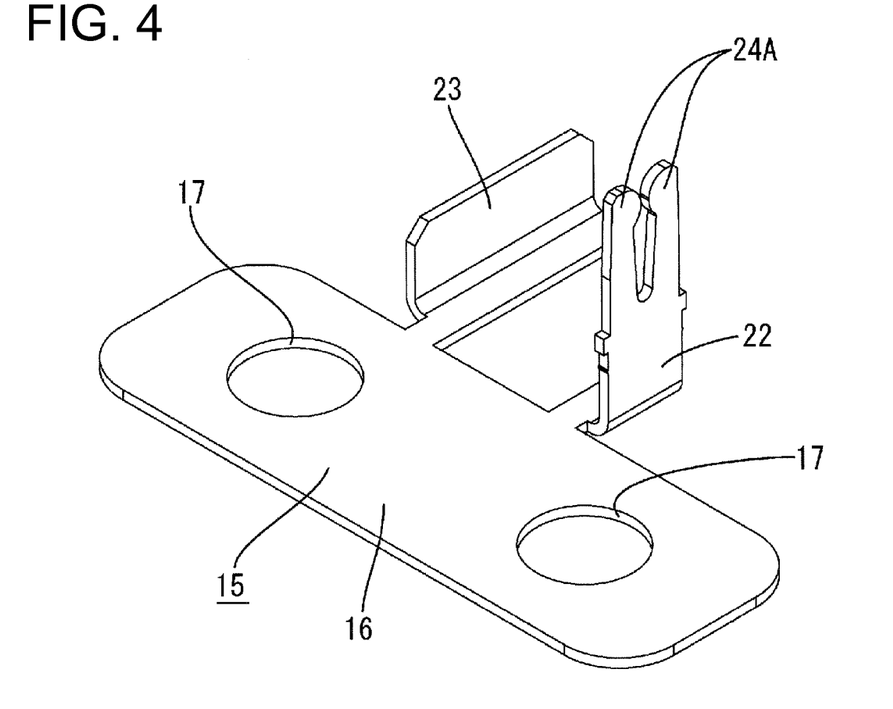
FIG. 4 is a perspective view of the connecting member.

The first terminal 22 is formed at a position between the pair of insertion holes 17, 17 out of the main body portion 16. As shown in FIG. 4, the first terminal 22 projects in the front-back direction and is bent upward at a side edge. An upper end part of the first terminal 22 is forked to form a pair of clamping portions 24A, 24A. A fuse 25 is electrically connected to the first terminal 22 by being clamped by these clamping portions 24A, 24A.

As shown in FIGS. 3 and 4, the locking portion 23 projects in the front-back direction from a position near the insertion hole 17 and bent upward at a side edge.

Figure 5:
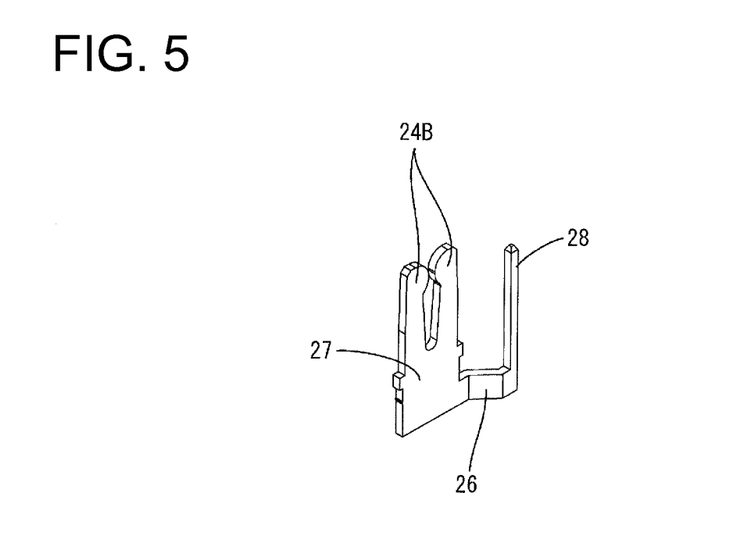
FIG. 5 is a perspective view showing a relay member.

As shown in FIG. 5, the relay member 26 is formed by press-working a metal plate material into a predetermined shape. The relay member 26 is made of the metal plate material such as copper, copper alloy or aluminum. The relay member 26 includes a fuse terminal 27 extending upward and having a pair of clamping portions 24B, 24B, and a relay terminal 28 connected to a lower end part of this fuse terminal 27 and extending upward. The relay terminal 28 is in the form of a long and narrow bar.

Figure 6:
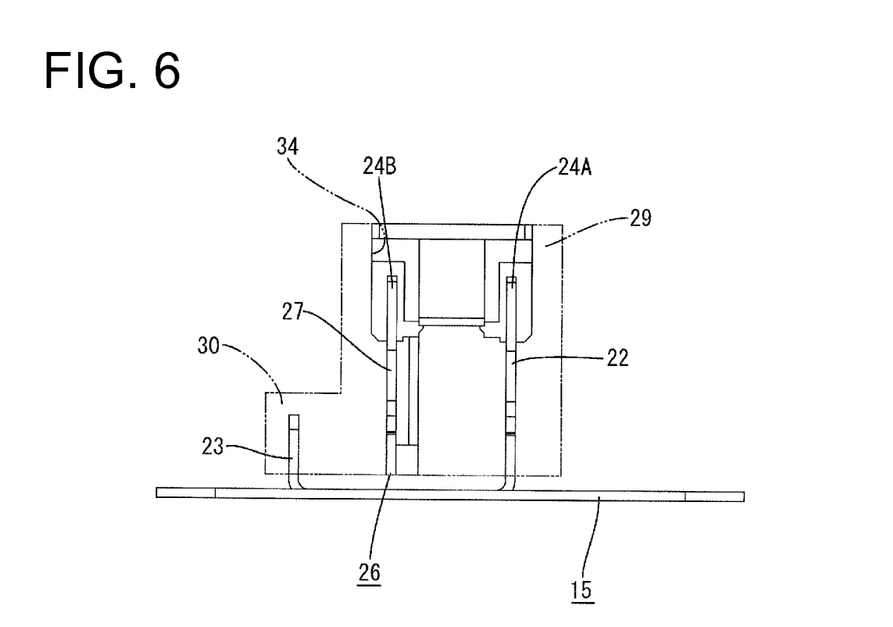
FIG. 6 is a side view showing a battery-side connector housing, the connecting member and the relay member.
Figure 7:
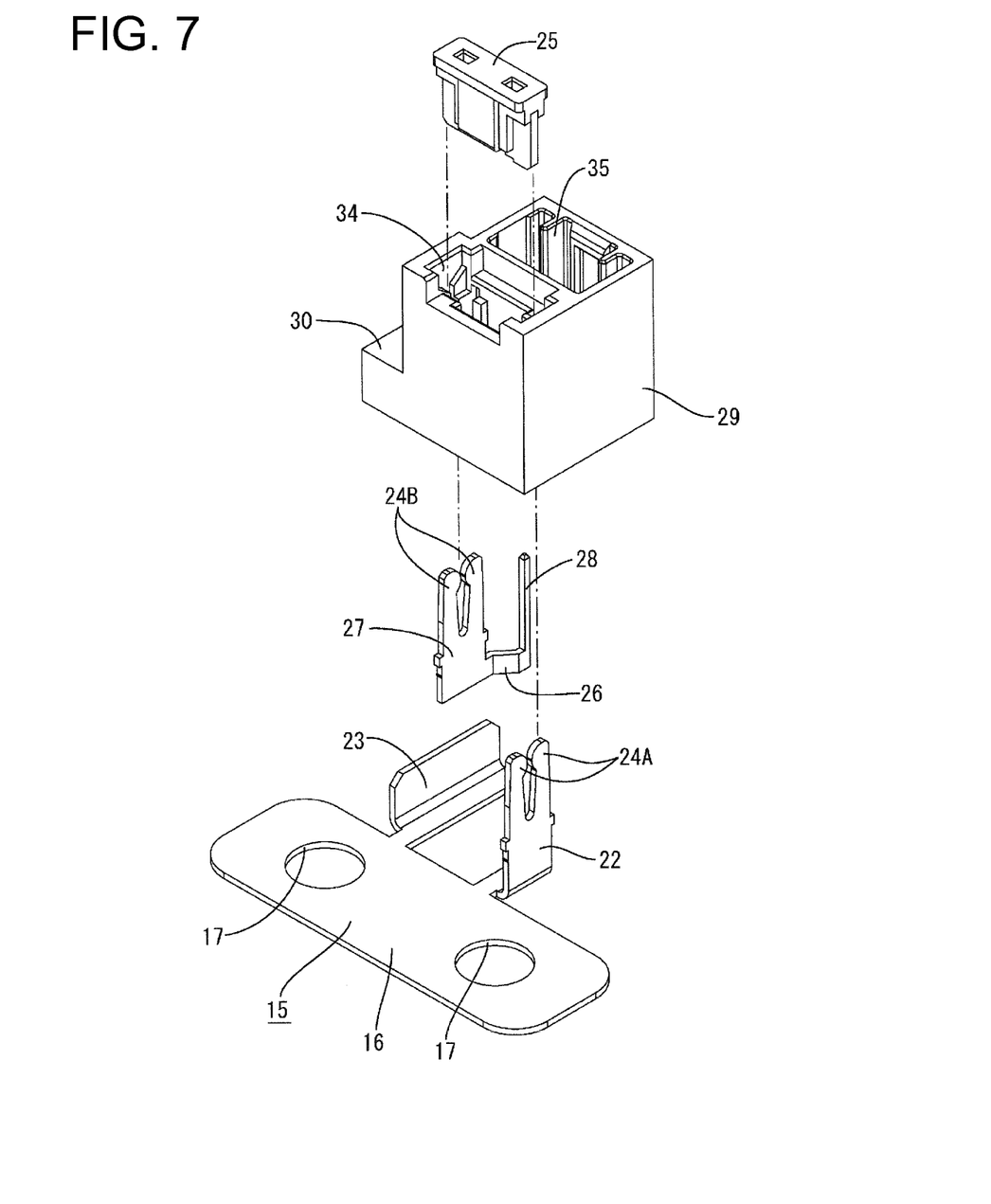
FIG. 7 is an exploded perspective view showing the connecting member, the relay member, the battery-side connector housing and a fuse.

As shown in FIG. 6, the first terminal 22 of the connecting member 15 and the relay member 26 are accommodated in a battery-side connector housing 29 made of synthetic resin. As shown in FIG. 7, the battery-side connector housing 29 has a substantially rectangular parallelepipedic shape. A lock receiving portion 30 projecting in the lateral direction is formed on a lower end part of the battery-side connector housing 29. A locking hole 31 into which the locking portion 23 is to be inserted is perforated in the lower surface of this lock receiving portion 30 to extend in the vertical direction. By press-fitting the locking portion 23 into the locking hole 31, the connecting member 15 and the battery-side connector housing 29 are fixed.

Figure 8:
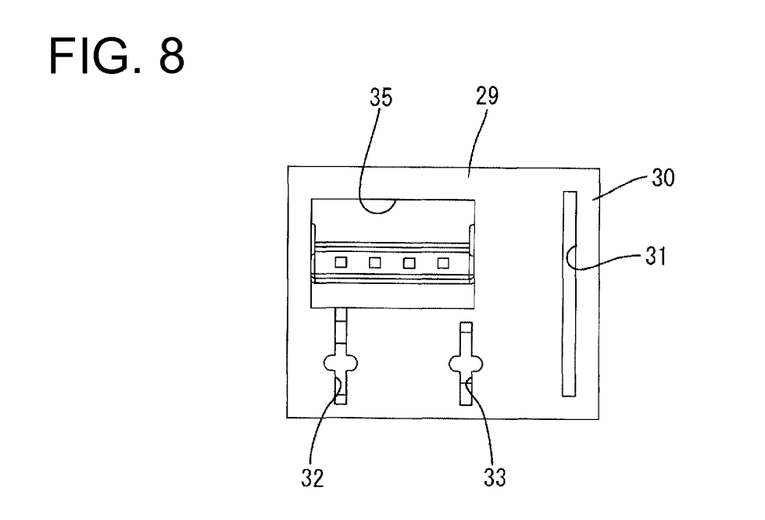
FIG. 8 is a bottom view showing the battery-side connector housing.

As shown in FIG. 8, a first terminal insertion hole 32 into which the first terminal 22 is to be inserted and a fuse terminal insertion hole 33 into which the fuse terminal 27 of the relay member 26 is to be inserted are perforated in the lower surface of the battery-side connector housing 29 to extend in the vertical direction.

Figure 9:
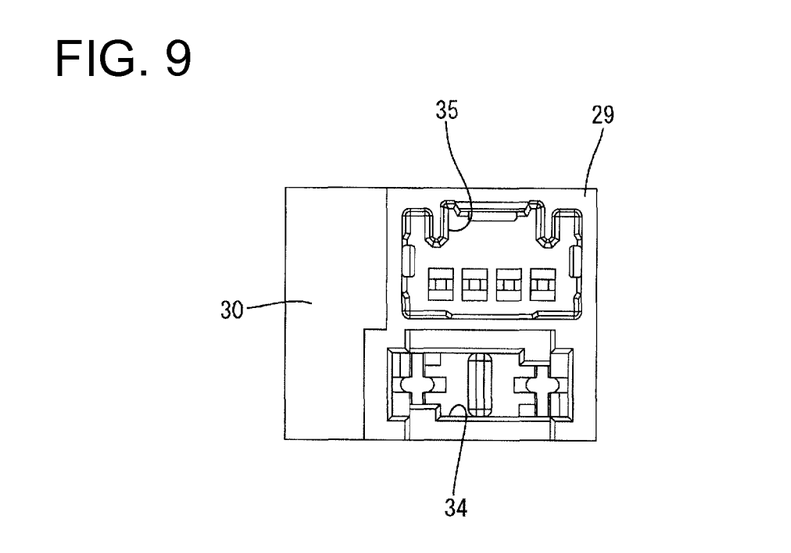
FIG. 9 is a plan view showing the battery-side connector housing.

As shown in FIG. 9, a fuse mounting portion 34 in which the fuse 25 is to be removably mounted is formed to be open upward in the upper surface of the wire-side connector housing 29. The fuse mounting portion 34 communicates with the first terminal insertion hole 32 and the fuse terminal insertion hole 33. As shown in FIG. 6, the first terminal 22 and the fuse terminal 27 are arranged in the fuse mounting portion 34.

Further, as shown in FIG. 9, a fitting tube portion 35 which is open upward is formed side by side with the fuse mounting portion 34 in the front-back direction in the upper surface of the wire-side connector housing 29. A wire-side connector housing 36 to be described later is to be fitted into this fitting tube portion 35 (see FIG. 10). The relay terminal 28 of the relay member 26 is arranged in a rising posture in the fitting tube portion 35.

Figure 10:
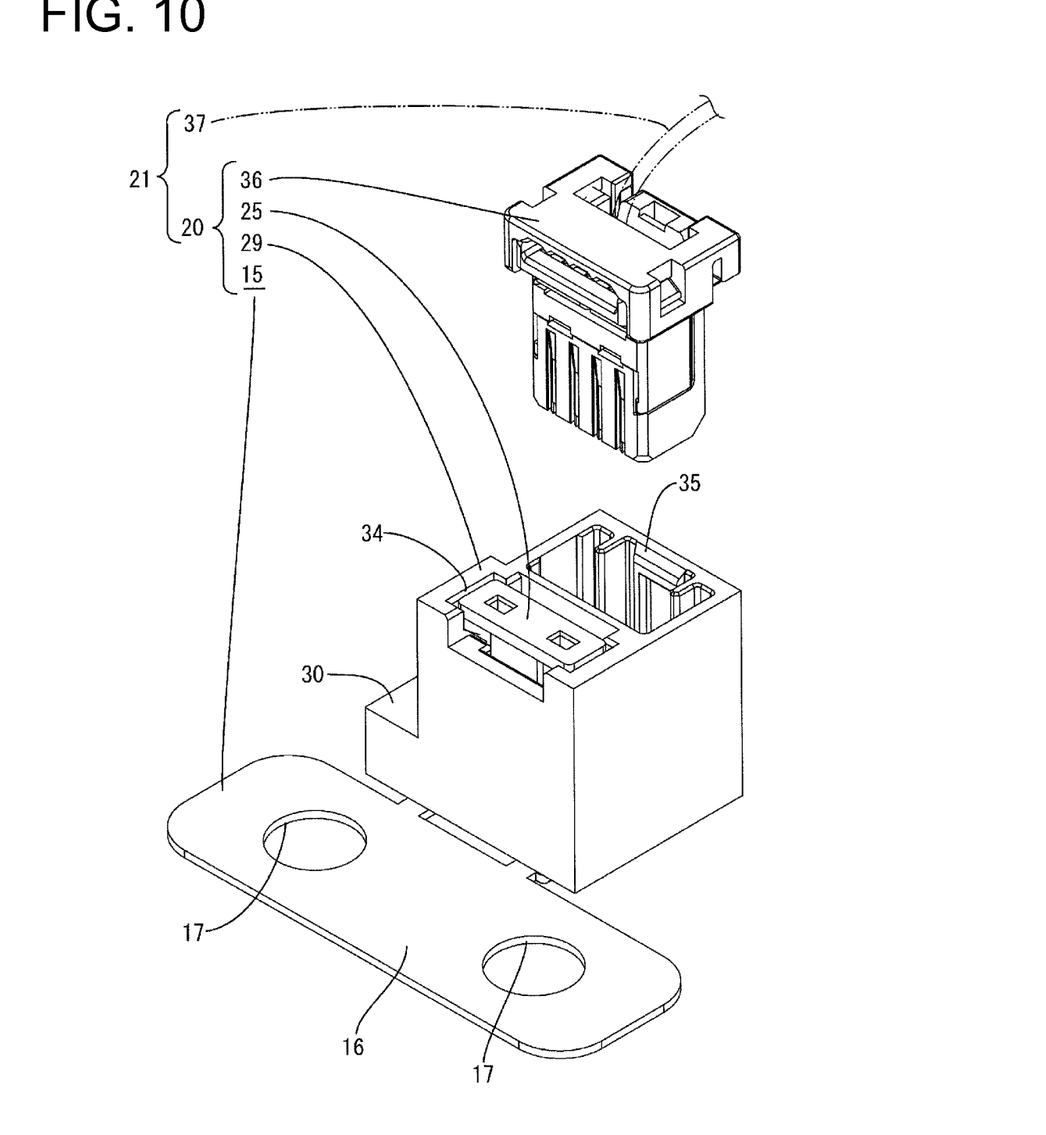
FIG. 10 is a perspective view showing a wire-side connector housing and the battery-side connector housing.

The wire-side connector housing 36 is made of synthetic resin and formed into a block as shown in FIG. 10. One wire 37 is drawn out from the upper surface of the wire-side connector housing 36. A second terminal (not shown) is connected to an end part of the wire 37. The second terminal is a known female terminal. This second terminal is accommodated in the wire-side connector housing 36. When the wire-side connector housing 36 is fitted into the fitting tube portion 35 of the battery-side connector housing 29, the second terminal and the relay terminal 28 are electrically connected.

The wire 37 drawn out from the wire-side connector housing 36 is connected to an unillustrated battery ECU. This battery ECU includes a microcomputer, devices and the like and has a known configuration provided with functions of detecting a voltage, a current, a temperature or the like of each battery cell 11 and controlling the charge and discharge of each battery cell 11.

The wiring harness 21 includes the connecting member 15, the battery-side connector housing 29, the wire-side connector housing 36, the wire 37 and the fuse 25 described above. Further, the connector 20 includes the connector housing 15, the battery-side connector housing 29, the wire-side connector housing 36 and the fuse 25.

Next, an example of an assembling process of the battery module 10 according to this embodiment is described. The assembling process of the battery module 10 is not limited to the one described below.

First, the second terminals are connected to the ends of the wires 37 by a known method such as crimping. These second terminals are accommodated into the wire-side connector housings 36.

The first terminals 22 are inserted into the first terminal insertion holes 32 of the battery-side connector housings 29. Further, the fuse terminals 27 are inserted into the fuse terminal insertion holes 33 of the battery-side connector housings 29. Subsequently, the fuses 25 are mounted into the fuse mounting portions 34.

Subsequently, the battery-side connector housings 29 are mounted on the battery cell group 13. First, the plurality of battery cells 11 are so arranged that adjacent electrode terminals 12A, 12B of adjacent battery cells 11 have different polarities, thereby producing the battery cell group 13. Subsequently, the electrode terminals 12A, 12B are inserted into the insertion holes 17, 17 of the connecting members 15. Subsequently, unillustrated nuts are threadably engaged with the electrode terminals 12A, 12B to fix the connecting members 15 to the electrode terminals 12A, 12B.

Thereafter, the wire-side connector housings 36 are fitted into the fitting tube portions 35 of the battery-side connector housings 29. Then, the electrode terminals 12A, 12B, the connecting members 15, the first terminals 22, the fuses 25, the fuse terminals 27, the relay members 26, the relay terminals 28, the second terminals and the wires 37 are electrically connected. In this way, the battery module 10 is completed.

Next, functions and effects of this embodiment are described. In this embodiment, the first terminal 22 of the connecting member 15 connecting the adjacent electrode terminals 12A, 12B is accommodated in the battery-side connector housing 29. Further, the fuse 25 to be connected to the first terminal 22 is arranged in the battery-side connector housing 29.

The wire-side connector housing 36 connected to the end part of the wire 37 is fitted into the fitting tube portion 35 of the battery-side connector housing 29. When the battery-side connector housing 29 and the wire-side connector housing 36 are connected, the electrode terminals 12A, 12B, the connecting member 15, the first terminal 22, the fuse 25 and the wire 37 can be easily connected. Since the connecting member 15, the fuse 25 and the wire 37 can be electrically connected by a simple method of connecting the battery-side connector housing 29 and the wire-side connector housing 36 as just described, the efficiency of the connecting operation can be improved.

Further, according to this embodiment, the battery-side connector housing 29 is formed with the fuse mounting portion 34 into which the fuse 25 is to be removably mounted, the fuse 25 is connected to the first terminal 22 and, further, the relay member 26 made of metal for electrically connecting the fuse 25 and the wire 37 is arranged in the battery-side connector housing 29. This enables the fuse 25 to be easily exchanged by removing the fused fuse 25 from the fuse mounting portion 34 and mounting a new fuse 25 into the fuse mounting portion 34.

Further, according to this embodiment, the fitting tube portion 35, into which the wire-side connector housing 36 is to be fitted, and the fuse mounting portion 34 are open in the battery-side connector housing 29, and the fitting tube portion 35 and the fuse mounting portion 34 are open in the same direction. This enables the wire-side connector housing 36 and the fuse 25 to be mounted into and detached from the battery-side connector housing 29 from and toward the same side (upper side in this embodiment). This can improve the efficiency of the assembling operation of the wire-side connector housing 36 and the fuse 25 as compared with the case where an opening direction of the fitting tube portion 35 and that of the fuse mounting portion 34 are different.

Further, according to this embodiment, the connecting member 15 is formed with the locking portion 23 and the battery-side connector housing 29 is formed with the lock receiving portion 30 to be engaged with the locking portion 23. This enables the battery-side housing to be mounted on the connecting member 15 by a simple method of engaging the locking portion 23 and the lock receiving portion 30.

The present invention is not limited to the above described and illustrated embodiment. For example, the following embodiments are also included in the technical scope of the present invention.

Although the fuse 25 is removably connected to the first terminal 22 and the fuse terminal 27 of the relay member 26 in this embodiment, there is no limitation to this. The fuse 25 may be fixed to the first terminal 22 and the fuse terminal 27 by a known method such as brazing, soldering or welding. In this case, the fuse mounting portion 34 may be omitted.

Although the second terminal is connected to the relay terminal 28 of the relay member 26 in this embodiment, there is no limitation to this. The second terminal and the fuse 25 may be removably connected.

Although the connecting member 15 and the battery-side connector housing 29 are assembled by the locking portion 23 in this embodiment, the locking portion 23 may be omitted.

The battery cells 11 may be connected in parallel by the connecting member 15.

Although the voltage of the battery cell 11 is detected by the wire 37 in this embodiment, there is no limitation to this. The wire 37 may detect a current flowing in the battery cell 11 or a temperature of the battery cell 11.

Although the fitting tube portion 35 and the fuse mounting portion 34 are formed to have the same opening direction in this embodiment, there is no limitation to this. The opening direction of the fitting tube portion 35 and that of the fuse mounting portion 34 may be different.

The number of the battery cells 11 constituting the battery module 10 is not limited to the number shown in the above embodiment.

Although the connecting member 15 is fitted to the electrode terminals 12A, 12B and fastened by the nuts in the above embodiment, there is no limitation to this. The battery cells 11 may include nut-type electrode terminals and the bolts may be fastened to the nut-type electrode terminals.

Although the connecting member 15 connects the electrode terminals 12A, 12B having different polarities (series connection) in the above embodiment, there is no limitation to this and it may connect the electrode terminals 12A (12B) having the same polarity (parallel connection). For example, another battery cell 11 is further connected in parallel to the battery module 10 of the above embodiment and the electrode terminals 12A (12B) having the same polarity in this parallel connection may be connected by a plurality of connecting members 15.

The invention claimed is:
1. A connector, comprising:
a connecting member including a main body portion with first and second spaced apart insertion holes penetrating therethrough for connecting adjacent positive and negative electrode terminals of a plurality of battery cells, a first terminal projecting from the main body portion at a right angle between the first and second insertion holes, and an end of the first terminal opposite the main body portion having first and second clamping portions;

a battery-side connector housing accommodating the first terminal;

a wire-side connector housing to be connected to the battery-side connector housing and an end part of a wire; and a fuse arranged in the battery-side connector housing and clamped between the first and second clamping portions of the first terminal to electrically connect the first terminal and the wire.

2. A connector according to claim 1, wherein:

a fuse mounting portion into which the fuse is to be removably mounted is formed in the battery-side connector housing; and a relay member made of metal for electrically connecting the fuse and the wire is further arranged in the battery-side connector housing.

3. A connector according to claim 2, wherein:

a fitting tube portion, into which the wire-side connector housing is to be fitted, and the fuse mounting portion are open in the battery-side connector housing; and the fitting tube portion and the fuse mounting portion are open in the same direction.

4. A connector according to claim 1, wherein:

the connecting member is formed with a locking portion; and the battery-side connector housing is formed with a lock receiving portion to be engaged with the locking portion.

5. A wiring harness, comprising:

a connecting member including a main body portion with first and second spaced apart insertion holes penetrating therethrough for connecting adjacent positive and negative electrode terminals of a plurality of battery cells, a first terminal projecting from the main body portion at a right angle between the first and second insertion holes, and an end of the first terminal opposite the main body portion having first and second clamping portions;

a battery-side connector housing accommodating the first terminal;

a wire-side connector housing to be connected to the battery-side connector housing;

a wire drawn out from the wire-side connector housing; and a fuse arranged in the battery-side connector housing and clamped between the first and second clamping portions of the first terminal to electrically connect the first terminal and the wire.

6. A wiring harness according to claim 5, wherein:

a fuse mounting portion into which the fuse is to be removably mounted is formed in the battery-side connector housing; and a relay member made of metal for electrically connecting the fuse and the wire is further arranged in the battery-side connector housing.

7. A wiring harness according to claim 6, wherein:

a fitting tube portion, into which the wire-side connector housing is to be fitted, and the fuse mounting portion are open in the battery-side connector housing; and the fitting tube portion and the fuse mounting portion are open in the same direction.

8. A wiring harness according to claim 5, wherein:

the connecting member is formed with a locking portion; and the battery-side connector housing is formed with a lock receiving portion to be engaged with the locking portion.

* * * * *